Oct. 4, 1927.

H. W. HOWLAND 1,644,432

COMBINATION PORTABLE ELECTRIC SAW AND DRILL

Filed Jan. 5, 1925    3 Sheets-Sheet 1

INVENTOR
Harry W. Howland
BY
Mason, Fenwick & Lawrence.
ATTORNEY

Oct. 4, 1927.
H. W. HOWLAND
1,644,432
COMBINATION PORTABLE ELECTRIC SAW AND DRILL
Filed Jan. 5, 1925   3 Sheets-Sheet 2
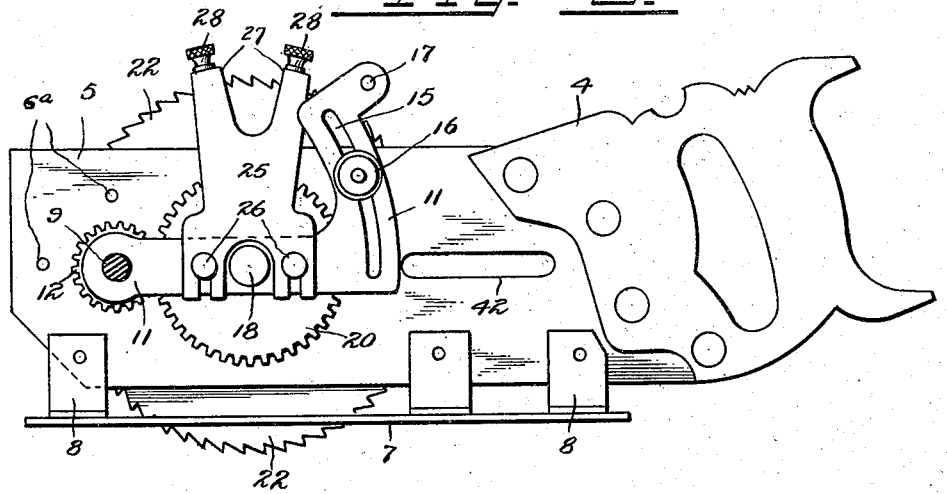
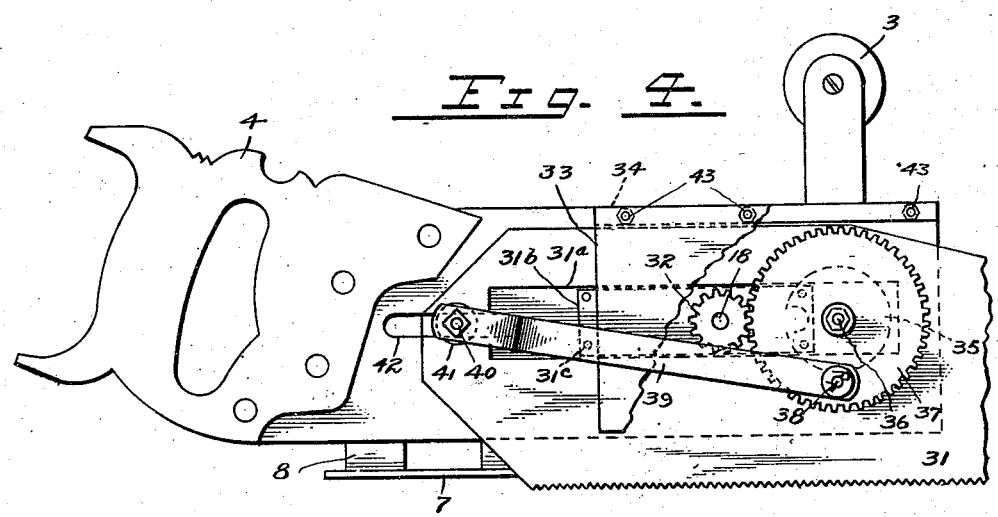
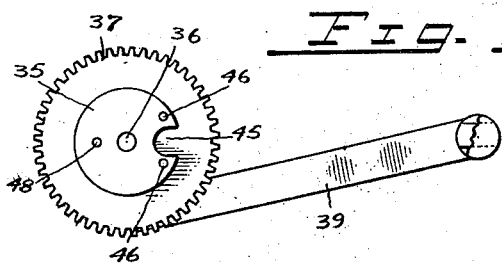
INVENTOR
*Harry W. Howland*
BY
*Mason, Fenwick & Lawrence.*
ATTORNEY Oct. 4, 1927. 1,644,432
H. W. HOWLAND
COMBINATION PORTABLE ELECTRIC SAW AND DRILL
Filed Jan. 5, 1925 3 Sheets-Sheet 3
Fig. 6.
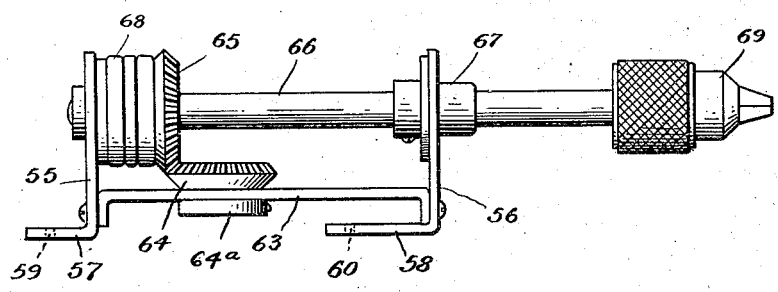
Fig. 7.
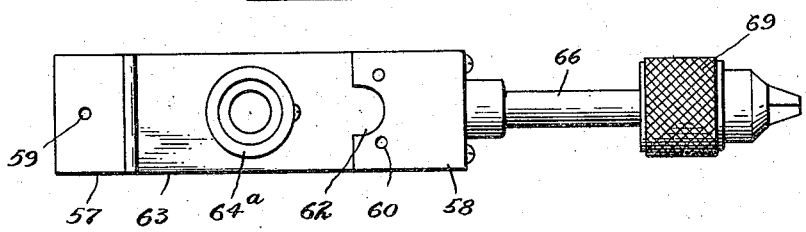
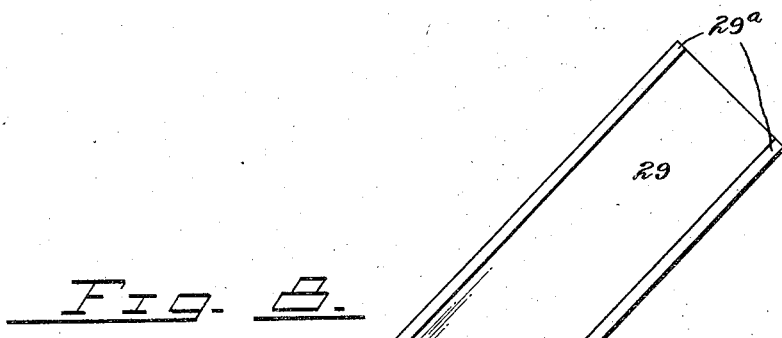
Fig. 8.
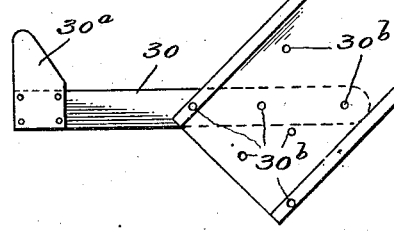
INVENTOR
Harry W. Howland
BY
Mason, Fenwick & Lawrence.
ATTORNEY Patented Oct. 4, 1927.

1,644,432

UNITED STATES PATENT OFFICE.

HARRY W. HOWLAND, OF SEATTLE, WASHINGTON.

COMBINATION PORTABLE ELECTRIC SAW AND DRILL.

Application filed January 5, 1925. Serial No. 640.

This invention relates to combination saws and drills adjustably connected to an electric motor, and particularly to a motor and frame for connecting for operation, drills or bits, and saws of both circular and reciprocating action, the whole to be readily moved from place to place and operated by one man directly on the work of construction of a building, or elsewhere.

The objects of the invention are to provide a combination tool or implement for use by a carpenter at his place of construction or erection of a building or elsewhere, whereby the work of sawing lumber in any position may be quickly done by power from an electric motor, either by a circular saw, or reciprocating saw, and whereby holes may be bored by bits or drills, by connecting a suitable chuck for holding the drills, to the same driving means as used for operating the saws; the entire combination tool of suitable light and compact construction so that one man can operate the same, in all positions that he might his ordinary saws and bits.

The particular object is to provide a combination tool for operating saws and boring instruments, with a small electric motor or other suitable portable motor, which is connected to a supporting frame with a base plate for sliding the same along on work or objects to be sawed, with a movable plate attached to the frame at one end by a pivot, and at the other end by an adjusting bolt or binding post fixed in the frame, and slidably positioned in a slot in the moving plate, with a spindle from the motor adjustably connected with a circular saw, or with a reciprocating crank arm attached to a sliding saw, or to a spindle for revolving a chuck for holding boring instruments, according to the kind of work to be done.

A further object is to provide a portable circular saw, with the cutting edge of the saw beneath the base of the supporting frame, with an angle gauge to be set upon the work to be sawed and the supporting frame then operated along the gauge on a predetermined angle on the work and the object to be cut in the same manner as in a mitre box, used by carpenters.

I have illustrated my invention by means of the accompanying drawings.

Figure 3 represents a rear elevation with the motor removed,

Figure 4 represents a front elevation with a straight saw attached and parts broken away.

Figure 5 represents a detail of crank attachment for a straight saw,

Figure 6 represents a bottom plan of a drill attachment,

Figure 7 represents a rear elevation of the drill attachment, and

Figure 8 represents a top plan of a mitre gauge for the saw;

Figure 1:
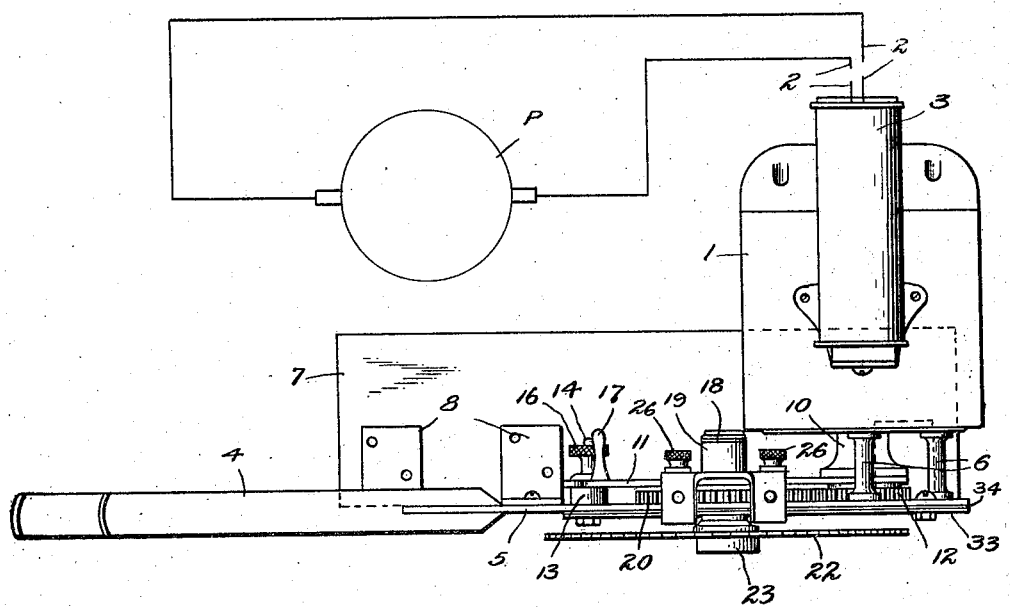
Figure 1 represents a top plan, with a circular saw attached.

Like numerals on the different figures represent like parts. Number 1 represents a small electric motor of ordinary standard form operated by wires 2 of any suitable length to enable the operator to move the machine to and about his work, with a handle 3 on the motor, and another handle 4 on the frame 5 which is attached to the motor by posts 6 in holes 6ª. A suitable base plate 7 is attached to the perpendicular flat frame 5 by means of angle brackets 8, the base plate extending back from the lower edge of the frame sufficiently to support the motor and the attached parts and to serve as a shoe or means for sliding the machine along the objects to be sawed.

The spindle 9 of the motor extends outward therefrom through a bushing member 10 and abuts against the inside of the frame 5, and a carriage plate 11 is pivotally mounted on the spindle 9 adjoining the outer end of the bushing 10, and a pinion gear 12 is attached to the outer end of the spindle 9 between the frame 5 and the plate 11, and a binding post body 13 is attached through the frame 5 at a point near the outer end of the plate 11 with a threaded stud bolt 14 extending from the body 13 through a curved slot 15 in the outer end of the plate 11, and a suitable binding nut 16 threaded on the stud 14 provides a means to bind the plate securely against the body 13 at such elevation as may be desirable for various forms of work for tools attached as hereinafter described. The handle 17 facilitates the movement of the plate as desired.

Figure 2:
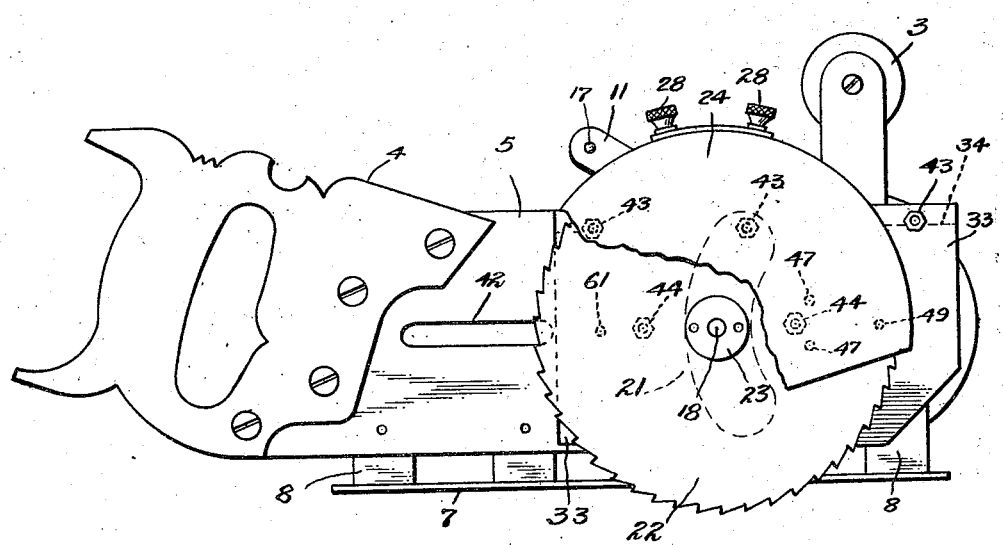
Figure 2 represents a front elevation with parts broken away.

A shaft 18 is journaled and attached through the plate 11 and extends at right angles from each side thereof. On the back side is mounted suitable boxing for journal bearing 19 and adjoining the plate 11 on the front side is attached a gear wheel 20 with cogs on its periphery which mesh in the cogs on the pinion 12 and is turned thereby. The shaft extends through the gear 20 and through a curved perpendicular slot 21 in the frame and is slidably adjusted therein, and on the outer front end of the shaft is fixed a circular saw 22, as shown in Figures 1, 2 and 3, by a lock nut 23. A safety guard 24 is mounted over the saw and held in position by a bracket 25 adjustably attached to the plate 11 by binding screws 26, the bracket provided with bends 27 at the upper corners into which binding screws 28 are threaded, and hold the guard when the circular saws are used.

In operation with the circular saws they may be raised or lowered by operation of the plate 11 to such point as may be desired that the lower teeth of the saw will reach and in cases where it is desired to cut across an object at any given angle with great accuracy I have provided a miter gauge as shown in Figure 8 in the form of a flat plate 29 with flanges 29$^a$ on each side, between which, the base plate 7 slides freely, and the saw blade cuts along the outside of flange. A registering arm 30 with a supporting cap 30$^a$ is adjustably connected to the gauge plate and may be set at any desired angle to which it may be desired the timber shall be cut. The arm is held by means of cap screws in the holes 30$^b$. But ordinarily the operator will use the saw freely by pushing the machine along any pencil mark on the work, with saw lowered to desired level.

In order to secure the advantages of a power saw in corners and positions where the circular saw and its attending parts cannot be used, I have provided a straight saw to be operated back and forth as any hand saw, with its front end protruding a sufficient distance beyond the motor so that the operator may by use of the protruding end, saw the object where only the saw blade may be inserted. I have shown such an arrangement in Figure 4, with the protruding cutting end of the saw 31 broken away, but it may be extended to such length as desired, in actual use.

In order to use the straight saw 31 I remove the saw 22 from the end of shaft 18 and affix in its place a driving pinion 32. The saw 31 is provided with a horizontal slot 31$^a$ through which the shaft extends. Within the slot 31$^a$ there is a guide block 31$^b$ attached by rivets 31$^c$ to the frame 5, and over the block and saw 31 is a guide plate 33 also attached to frame 5 by bolts 43 through a spacing flange 34, along the top of the frame, to hold the plate away from the outside face of the frame a sufficient distance to allow free movement of the saw between the same. An axle lug 35 is attached to the plate 33, by which is supported a stub axle 36, on which is mounted a crank gear 37, with cogs on its periphery which mesh in the cogs on pinion 32 and are turned thereby. On one side of the gear 37 is a crank pin 38 on which is mounted one end of a crank rod 39 the other end of this rod is mounted on a wrist pin 40, which extends out from a crosshead block 41 slidably mounted in a horizontal slot 42 in the frame 5. The wrist pin also passes freely through the saw blade near that end of the saw.

In operation as the pinion 32 drives the crank gear 37 the saw blade is reciprocated back and forth in the same manner as the ordinary hand saw is driven by hand. The blade 31 is held in its position by the guide plate 33, and cross head pin and by the guide block 31$^b$.

The bolts 43 for connecting the frame and guide plate are above the saw 31, and another connecting bolt 44, is used through the slot 31$^a$, and the lug 35 is cut out as 45 to fit around 44. Holes 46 in lug 35 carry bolts for the holes 47 through the guide and into the frame and also pass through the slot of the saw, and an additional bolt may be used through the hole 48 in the lug 35 and the hole 49 in the guide plate 33.

Where it is desired to use a drill or boring bit, the pinion 32 is removed with lug 35 and the crank gear and its connecting rod; also the saw 31; and there is attached a drill chuck shown in Figures 6 and 7, by means of frames 55, and 56 with angular feet 57 and 58, provided with bolt holes 59 and 60 for attachment to the guide plate with suitable bolts in holes 47 and 61. A suitable notch 62 is cut out from the foot 58 to fit around the bolt 44. The frames are connected by a brace bar 63 through which is journaled a bevel gear pinion 64 and collar 64$^a$ which are screwed upon the outer end of the shaft 18 in place of the pinion 32. A bevel gear wheel 65 is mounted on a shaft 66, which is suitably held by the frames in journals 67 and 68. On one end of the shaft 66 is provided a suitable chuck 69 for holding any desired form of boring instrument.

It will be readily understood that the turning of the motor spindle will impart a circular motion to the shaft 66 and any boring instrument held in its chuck, and the operator may use the instrument by pressing forward the machine by holding the same, or move it along the channel 29 of the gauge, set at any predetermined angle, with the work.

While I have shown an electric plant P and motor for power, other suitable motors may be used as flexible cable attached to the spindle 9, driven by air or steam.

Having described my inventions I make the following claims:

1. A portable tool comprising a motor having a frame affixed to one end thereof, a supporting base attached to the frame, a movable plate abutting the inside of the frame and adjustably connected therewith at the outer end by a binding post affixed to the movable plate and slidably mounted in a slot in the frame, the inner end of the movable plate being pivotally mounted on the motor spindle extending from the end of the motor, a pinion affixed to the motor spindle between the motor and the movable plate, a shaft journaled through the movable plate and slidably adjustable through a curved perpendicular slot in the frame, a driving gear fixed on the shaft and meshing with the pinion, and means on the frame and on the outer end of the shaft for attaching a tool.

2. A portable tool comprising a motor, a perpendicular frame attached to the motor, a horizontal base affixed to the frame and near the lower edge thereof, a spacing flange along the outside of the frame at the top thereof, a guide plate attached to the flange and extending down therefrom to near the bottom of the frame at the front end thereof, a handle on the rear end of the frame, a horizontal slot in the frame between the guide plate and the handle, a straight saw mounted in the space between the frame and the guide plate, the saw attached to a crosshead at one end slidably mounted in the horizontal slot in the frame, a wrist pin extending from the cross head through the saw, one end of a crank rod mounted on the wrist pin, the other end of the crank rod mounted on a crank pin on one side of a crank gear revolvably mounted on an axle attached to the guide plate; a spindle extending from the motor to the frame, a driving pinion attached to the spindle with a shaft journaled through the frame and a gear wheel attached to the inner end of the shaft with teeth meshing with the driving pinion teeth, the other end of the shaft extending out from the frame and through a horizontal slot in the saw blade, and carrying affixed on its outer end a pinion with teeth on its periphery meshing with teeth upon the crank gear to operate the same.

In testimony whereof I affix my signature.

HARRY W. HOWLAND.

CERTIFICATE OF CORRECTION.

Patent No. 1,644,432.                                            Granted October 4, 1927, to

HARRY W. HOWLAND.

It is hereby certified that the above numbered patent was erroneously issued to the inventor said "Howland" whereas said Letters Patent should have been issued to "Electric Hand Saw Company, of Seattle, Washington, a corporation of Washington", as assignee of the entire interest in said invention, as shown by the records of assignments in this office; and that the said Letters Patent should be read with this correction therein that the same may conform to the record of the case in the Patent Office.

Signed and sealed this 20th day of December, A. D. 1927.

Seal.                                                                    M. J. Moore,
                                                                   Acting Commissioner of Patents.